Dec. 23, 1969 G. A. ROSICA ET AL 3,486,108
APPARATUS FOR ELIMINATING CABLE EFFECTS FROM CAPACITIVE TRANSDUCERS
Filed June 22, 1967
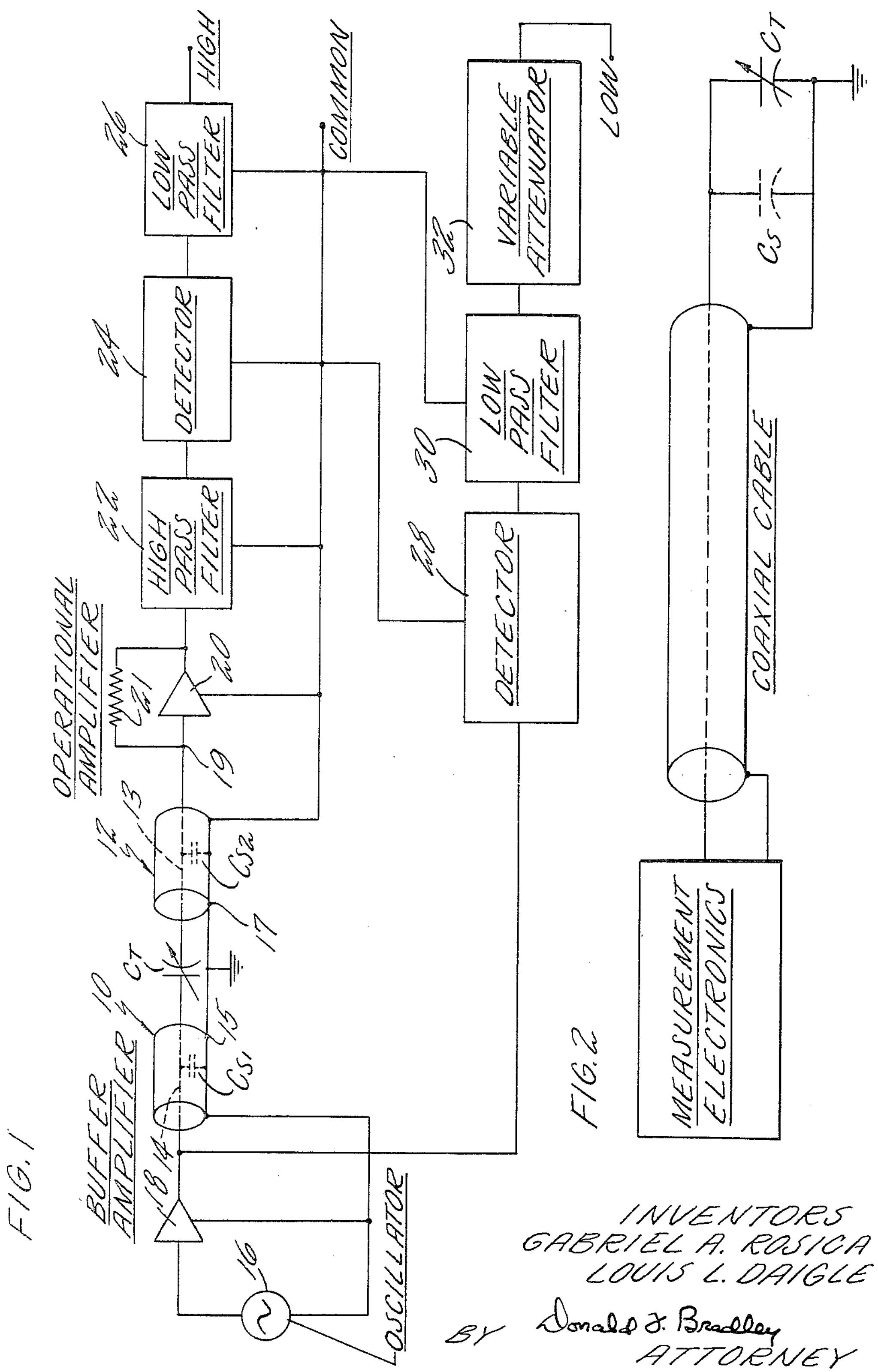
INVENTORS
GABRIEL A. ROSICA
LOUIS L. DAIGLE
BY Donald J. Bradley
ATTORNEY United States Patent Office 3,486,108
Patented Dec. 23, 1969

3,486,108

APPARATUS FOR ELIMINATING CABLE EFFECTS FROM CAPACITIVE TRANSDUCERS

Gabriel A. Rosica and Louis L. Daigle, Manchester, Conn., assignors to United Aircraft Corporation, East Hartford, Conn., a corporation of Delaware Filed June 22, 1967, Ser. No. 648,167
Int. Cl. G01r *27/26*
U.S. Cl. 324—61 7 Claims

ABSTRACT OF THE DISCLOSURE

A signal conditioner for eliminating the effect of cable capacitance in capacitive transducers by mounting the transducer with both plates floating from ground between two shielded cables, applying an essentially constant AC carrier voltage through one of the cables to the transducer and feeding the AC carrier current through the transducer through the other cable to the input of an operational amplifier. A null voltage is obtained by rectifying the capacitor current and differentially comparing it with a reference DC voltage obtained from the AC carrier source.

BACKGROUND OF THE INVENTION

Field of the invention

This invention relates to a signal conditioner for capacitive transducers, and in particular a circuit for eliminating the shunt capacity in the cables to a capacitive transducer. Connected to the output of the signal conditioning circuitry is a stable null balance circuit to permit operation with any initial value of capacitance.

Description of the prior art

Capacitive transducers are commonly used for the measurement of physical quantities such as sound pressures in wind tunnel testings. It is frequently desirable to extend the frequency response range of such devices down to direct current which makes the measurement of static pressures possible. Since the capacitive transducer is a reactive element, prior art devices found it desirable to employ a carrier system and an impedance bridge, one leg of which is comprised of the active capacitive transducer. The bridge can then be balanced at the carrier frequency to suppress the carrier at a preset pressure level, and to make possible amplitude modulation of the carrier as the pressure on the capacitive transducer changes.

Such systems require the use of a complex and expensive phase sensitive demodulator to recover the information of interest. Another disadvantage of this technique is the cable capacitance which is in shunt with the transducer. This not only drastically reduces the sensitivity, but any change in this shunt capacitance appears as a change in the transducer capacitance and therefore as an erroneous change in signal.

SUMMARY OF THE INVENTION

A simple and inexpensive circuit has been developed for eliminating the effect of cable capacitance when using capacitive transducers. Because of its low cost this invention is particularly applicable to data acquisition systems where many transducers are employed.

In many installations the distances from the system electronics to the instrument cluster may be in excess of 100 feet, resulting in cable capacitance that is two to three orders of magnitude greater than the capacitance of the transducers. The invention described herein allows the measurement of static as well as dynamic parameters up to several thousand cycles with an overall accuracy of better than 1%.

Another novel aspect of this invention is a technique for recovering the modulating signal from the capacitive transducer without the complexities and problems of phase sensitive detection in a form suitable as an input to a data acquisition system.

Briefly, the capacitive transducer is mounted with both plates floating from ground between tow coaxial cables. An essentially constant AC voltage is applied at the input to one of the coaxail cables, and a measuring device is placed at the end of the other coaxial cable to detect the output current. By utilizing a low output impedance voltage generator to produce the AC signal, and by utilizing an operational amplifier to make the output current substantially equal to the current through the capacitive transducer, the cable capacitance is substantially isolated from the transducer capacitance.

In accordance with another aspect of the invention, an output nulling signal is produced in a manner that does not require phase sensitive detection of the primary signal, but still utilizes the original signal source to minimize output zero drift due to any changes in amplitude of the signal driving the transducer.

It is therefore an object of this invention to provide a signal conditioner for a capacitive transducer in which cable capacitance is effectively eliminated, thus greatly increasing the sensitivity of the transducer and the signal to noise ratio of the system.

Another object of this invention is a signal conditioner for a capacitive transducer in which a DC nulling technique independent of the phase of the signal is used.

DESCRIPTION OF THE DRAWINGS

FIGURE 1 shows in partial block diagram form a schematic circuit of the signal conditioner of this invention.

FIGURE 2 is a schematic representation of a capacitive transducer in a conventional circuit.

DESCRIPTION OF THE PREFERRED EMBODIMENT

The equivalent circuit of a typical capacitive transducer with a coaxial cable connected thereto is represented as seen in FIGURE 2 as two parallel capacitors at the end of the cable, one of the capacitors $C_T$ representing the variable transducer capacitance which changes with the parameter being measured, and the other capacitor $C_s$ representing the lumped capacitance in the cable connecting the output circuit to the transducer. Although the equivalent circuit will show the cable capacitance $C_s$ as a fixed element, it is not fixed. Changes in temperature as well as flexing of the cable result in changes of $C_s$. An extreme case of variation in $C_s$ is that in which the cable to the transducer passes through slip rings.

In order to prevent errors it is desirable to eliminate the effect of the cable capacitance $C_s$ in a manner which will not only remove the initial static error due to its presence, but will also take into account any dynamic variations of $C_s$ during the course of the measurement. In the prior art a variety of bridge type measuring techniques were used to eliminate cable capacitance. These bridge type techniques simply null out the error and take no account of variations in $C_s$, that is, there is no simple way to distinguish a change in the cable capacitance from a change in the capacitance of the transducer once the null has been accomplished and the transducer added to the circuit.

The invention described herein is a capacitive transducer signal conditioner which isolates the cable capacitance $C_s$ from the transducer capacitance $C_T$ by providing an accessible node between the cable and the transducer.

This is done by mounting the capacitive transducer with both plates floating from ground and using two coaxial cables. As shown in FIGURE 1, the capacitive transducer $C_T$ is connected between two coaxial cables 10 and 12. The center conductors 14 and 13 of each coaxial cable are each connected to a different plate of the capacitive transducer $C_T$, while the shields of each coaxial cable are connected together and grounded.

With this configuration the cable capacitance $C_s$ for each cable appears between the center conductors 13 and 14, and ground and not directly in shunt with the transducer capacitance $C_T$. The cable capacitances for each cable are represented by $C_{s1}$ and $C_{s2}$. The cable shields 15 and 17 are connected together and then grounded, the grounded terminal being the desired isolating node.

An AC voltage source such as an oscillator 16 of 20,000 cycles, for examles, generates a voltage which is fed through buffer amplifier 18 and through coaxial cable 10 to the capacitive transducer $C_T$.

In order to isolate the cable capacitance from the transducer capacitance, it is necessary that the output current be the total current that flows through the capacitive transducer $C_T$, and that the magnitude of the output current be determined solely by the value of $C_T$ at any instant of time. In order for this to be true, two conditions must be met. First, the voltage applied to the transducer network must be essentially constant and independent of changes in $C_{s1}$, $C_{s2}$ or $C_T$ since the output current will be very much a function of this voltage. This condition can only be met if the source impedance of the input is sufficiently small so that a negligible voltage drop across it results for changes in the input voltage. This condition is easily met by using a low output impedance buffer amplifier 18.

In many systems it is desirable to drive many signal conditioners simultaneously from oscillator 16. The buffer amplifier 18 provides a high input impedance to reduce loading on the oscillator 16, and also provides a low output impedance of a few ohms capable of driving a capacitive load. The capacitive load usually requires some form of push-pull configuration for the buffer amplifier output stage in order to prevent the output transistor from being cut off on the signal backswing.

The second condition is that the current output must be equal to the transducer current, that is, the current through the capacitance in cable 12 represented by $C_{s2}$ must be reduced to practically zero. In order to reduce this current to zero it is necessary to reduce the output voltage to zero, but this must be done while maintaining the ability to measure the output current. Therefore a current measuring device which operates with a negligible potential across its input terminals is required. This condition is met by the summing point 19 of an operational amplifier 20 which is connected to the output center conductor of coaxial cable 12. Due to its large open loop gain, operational amplifier 20 maintains its input at a virtual ground while developing a voltage at its output proportional to the product of the input current and the impedance of the feedback element 21 connected around the operational amplifier.

The virtual ground thus appearing at the summing point of operational amplifier 20 is directly across $C_{s2}$ and therefore reduces the voltage across $C_{s2}$. As a result the current through $C_{s2}$ is reduced to a negligible amount. The operational amplifier 20 may also produce a nominal gain.

For many purposes the output from the operational amplifier 20 is quite useful, since the circuit thus far described eliminates the effect of the cable capacitance. However, in order to be useful in a data acquisition system it is desirable to be able to null out any signal that might be present under ambient conditions. For example it is often desirable to null out the signal from a capacitive pressure transducer at atmospheric pressure so that under test conditions gauge pressure may be measured. In addition, since the output of the operational amplifier 20 at this point provides an amplitude modulated carrier signal, the envelope of which follows the measured parameter variations as reflected by changes in $C_T$, and since a modulated signal is not compatible with most data acquisition systems, some form of signal detection is necessary to produce only the envelope signal at the output.

A high pass filter 22 is connected to the output of the operational amplifier in order to filter out unwanted DC drift in the operational amplifier and any low frequency noise that might be present.

Connected to the high pass filter 22 is a detector 24 which rectifies the modulated signal. The rectified signal now passes through low pass filter 26 for smoothing purposes.

The cutoff frequencies of the high and low pass filters 22 and 26 are determined by the desired signal bandwidth. With a carrier frequency of 20,000 cycles, and a 2,000 cycle cutoff frequency for both the high and low pass filter, adequate operation is obtained. However. there is no reason why operation with integrated operational amplifiers could not be extended to carrier frequencies up to 500,000 cycles and bandwidths up to 50,000 cycles.

For optimum noise rejection, the high pass filter 22 could be replaced by a bandpass filter centered at the carrier frequency with appropriate bandwidth for the modulating signals.

The phase of the output signal is of no concern, and therefore phase sensitive detection is not required. This feature results in a great deal of simplicity in the detector circuits.

The output nulling signal is also obtained in a manner that does not require phase sensitive detection of the primary signal, but still utilizes the original signal source to minimize output zero drift due to changes in amplitude of the signal driving the transducer. Referring to FIGURE 1, the output from the buffer amplifier 18 is fed to a second detector 28 and a low pass filter 30 which results in a DC signal proportional to the amplitude of the signal driving the transducer $C_T$. A variable attenuator 32 is connected to receive the signal from the low pass filter in order to provide for adjusting the magnitude of the null voltage to the desired level.

The signal conditioner output is thus a two wire balanced signal and a ground, and the signal is fed to a data system differential amplifier. The differential amplifier, not shown, then produces an output proportional to the high output signal from low pass filter 26 minus the low output signal from variable attenuator 32. If the signals are not equal, the attenuator 32 is varied so that the high and low output signals are equal. Thus the desired null signal is accomplished by adjusting the null signal to correspond to the transducer under ambient conditions. For ideal operation the signal from the summing point 19 to the output should be shielded so as not to be interfered with by the carrier signal at the buffer amplifier 18 and the undetected nulling signal. Operated in this way it is possible to resolve changes in capacitance of $.001 \times 10^{-12}$ farads with negligible noise and drift while operating with a cable capacitance of up to $.01 \times 10^{-6}$ farads.

Having thus described a preferred embodiment of our invention, what we claim as new and desire to secure by Letters Patent of the United States is:

1. A signal conditioner for eliminating the effects of cable capacitance from a capacitive transducer comprising first and second coaxial cables containing capacitance, means for electrically connecting said transducer between the inner conductors of said first and second cables with each plate of said transducer being connected to one of said cables, said transducer being electrically floating from ground, a source of high frequency AC voltage having a low output impedance, means supplying said AC voltage across the conductors of said first cable to generate a current through said transducer, the magnitude of said current being dependent on the capacitance of said transducer, means connecting the outer conductors of said first and second cables to a common point, an operational amplifier having an input terminal and an output terminal, and feedback means connected between said input and output terminals, and means for connecting the other end of said second cable to said amplifier input terminal to produce a modulated output voltage from said amplifier proportional to the current through said transducer.

2. A signal conditioner as in claim 1 for eliminating the effects of cable capacitance from a capacitive transducer in which a DC output signal is produced proportional to the capacitance of said transducer comprising first rectifying means for converting said modulated output voltage into a DC output signal, and means for generating from said AC voltage source a DC reference signal adapted to null said DC output signal.

3. A signal conditioner as in claim 2 in which said DC reference signal generating means includes further rectifying means, and attenuating means connected with said further rectifying means for varying the magnitude of said DC reference signal.

4. A signal conditioner for eliminating the effects of cable capictance from a capacitive transducer comprising a capacitive transducer, first and second shielded cables having a conducting portion and a shield portion, means for electrically connecting said transducer between the conducting portion of said first and second cables, means for connecting the shielded portion of said first and second cables to an electrically common terminal, said transducer thereby being isolated from said common terminal and electrically floating, a source of substantially constant high frequency AC voltage, means supplying said AC voltage through said first cable to generate a current through said transducer, and an operational amplifier having an input terminal and an output terminal, and feedback means connected between said input and output terminals, said input terminal connected to the other end of said second cable for producing a modulated output voltage proportional to the current through said transducer.

5. A signal conditioner as in claim 4 and including a buffer amplifier connected between said AC voltage source and said first cable.

6. A signal conditioner as in claim 4 and including first detector means connected to receive said modulated output voltage to produce a DC output signal proportional to the current through said transducer, and means to produce from said AC voltage source a DC reference signal adapted to null said DC output signal.

7. A signal conditioner as in claim 6 in which said means to produce said DC reference signal includes second detector means, and variable attenuator means connected to said second detector means for adjusting the magnitude of said reference signal.

References Cited

UNITED STATES PATENTS

| | | | |
|---|---|---|---|
| 2,431,841 | 12/1947 | Storm | 324—61 |
| 2,519,668 | 8/1950 | Konigsberg | 324—61 X |
| 2,933,677 | 4/1960 | Lieber | 324—34 |
| 3,034,044 | 5/1962 | Konigsberg | 324—57 |
| 3,075,086 | 1/1963 | Mussard. | |

EDWARD E. KUBASIEWICZ, Primary Examiner